Figure 1:
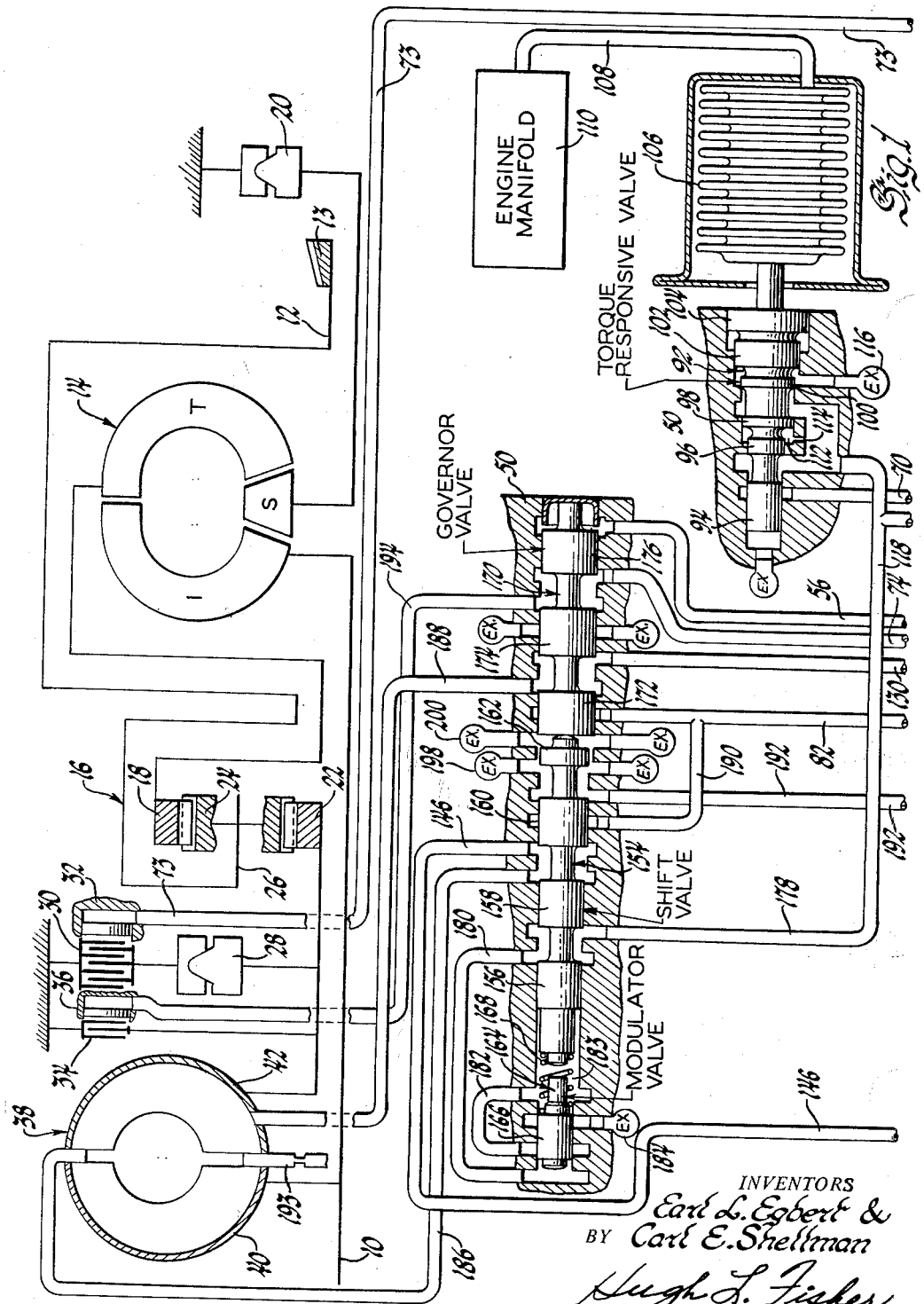

Sept. 10, 1963

E. L. EGBERT ETAL 3,103,129

TRANSMISSION

Filed June 19, 1959

2 Sheets-Sheet 1

INVENTORS
Earl L. Egbert &
BY Carl E. Shellman

Hugh L. Fisher
ATTORNEY

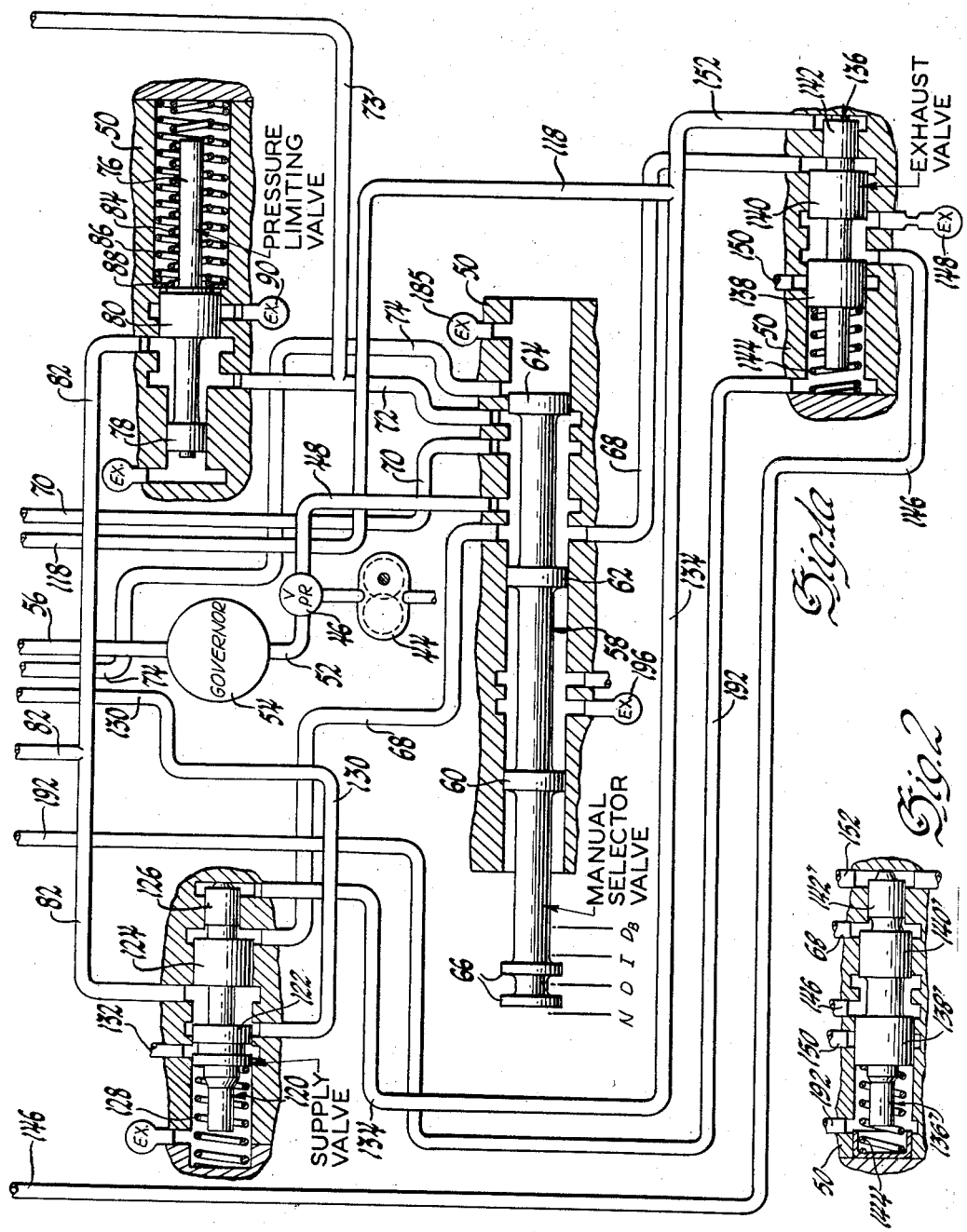

3,103,129
TRANSMISSION
Earl L. Egbert and Carl E. Shellman, Detroit, Mich.,
assignors to General Motors Corporation, Detroit,
Mich., a corporation of Delaware
Filed June 19, 1959, Ser. No. 821,597
22 Claims. (Cl. 74—472)

This invention relates generally to transmissions, and particularly to vehicle transmissions incorporating hydrodynamic devices.

Hydrodynamic devices, such as torque converters and fluid couplings, are generally designed for efficient forward driving and therefore are inefficient during coast driving when the drive direction is in the opposite sense. Because of this coast drive deficiency, normally available engine braking cannot be fully utilized and the vehicle brakes must assume an added burden. Under these conditions, the vehicle brakes must necessarily be replaced oftener than otherwise would be required.

One way of supplementing the vehicle brakes is to provide a coast brake that resists rotation of the transmission output shaft or some connected part during intervals of need. The addition of such a coast brake, however, requires space, which is not always available, and controls for correlating the operation of the coast brake with that of the vehicle brakes as well as that of the transmission. Also, provision must be made for immediate interruption of the supplemental coast braking if the vehicle driver suddenly changes from coast drive to forward drive, for instance, by depressing a previously released accelerator pedal.

With these problems in mind, the invention contemplates an arrangement whereby a hydrodynamic device performs as a clutch when a forward drive train is effective and as a brake when a coast drive train is effective. The invention further contemplates a unique system of interrelated controls for the device whereby clutch controls for the device advise brake controls that the device is to function as a clutch. When the device is to perform as a brake, the clutch controls prepare the brake controls for operation. Also, the system is arranged according to the invention so as to interrupt the operation of the brake controls should coast driving suddenly be changed to forward driving.

More specifically, the invention seeks to provide a hydrodynamic brake with controls that supply pressure fluid thereto according to a predetermined scheme and relieve pressure fluid therefrom so as to afford adequate circulation therethrough for the braking action. Additionally, a torque demand responsive arrangement is provided for interrupting the braking action whenever coast driving changes to forward driving as evidenced by the resultant reversal of torque.

According to a preferred form of the invention, a transmission is provided with forward drive and coast drive trains to each of which a hydrodynamic device is common. A control system for the hydrodynamic device includes a selector valve that performs as a distributor of pressure fluid derived from a suitable source. When the selector valve is set for forward drive, the forward drive train is conditioned for a low speed ratio and thereafter when a predetermined vehicle speed and road load relationship exists, a shift valve moves from a downshifted position to an upshifted position and permits communication between the source of pressure fluid and the hydrodynamic device. The hydrodynamic device then commences to operate as a fluid clutch, and a higher speed ratio is thereby established.

When the selector valve is moved to the coast drive setting, a supply valve and an exhaust valve for the device become operative, both having been maintained in their respective inoperative positions by pressure fluid delivered thereto when the selector valve was in the forward drive setting. The supply valve establishes communication between the source and the shift valve, and assuming the shift valve is in the downshifted position, pressure fluid is delivered to the hydrodynamic device so as to commence operation thereof as a fluid brake. The exhaust valve causes the pressure fluid within the hydrodynamic device to be relieved through a restricted outlet passage, this relief being adequate for circulation during the braking action.

If the coast drive is suddenly changed to forward drive by depressing the accelerator pedal, provision is made for moving both the supply valve to the inoperative position in which the supply of pressure fluid to the hydrodynamic device is interrupted and the exhaust valve to a position in which communication is established between the hydrodynamic device and an unrestricted outlet passage. As a result, the device is quickly drained, and the braking action is stopped.

In the forward drive setting of the selector valve, when the shift valve is in the downshifted position, the exhaust valve will be moved to the unrestricted exhaust position because of the pressure fluid delivered thereto by the selector valve. When the shift valve is moved to the upshifted position, relief of pressure fluid from the device is then so controlled that the hydrodynamic device may properly perform as a clutch, circulation therethrough being at a rate adequate for cooling and lubrication purposes.

A pressure limiting valve is installed in the system such that should the demands from the hydrodynamic device when being filled become excessive and tend to reduce pressure to a dangerous level downstream therefrom, the pressure limiting valve will halt the supply of pressure fluid thereto until the system can again build up to the desired level. Also, if the pressure tends to build up excessively in the hydrodynamic device, the pressure limiting valve will aid in the relief of this excessive pressure.

The foregoing and other objects and advantages of the invention will be apparent from the following description and from the accompanying drawings in which:

FIGURES 1 and 1a show schematically a vehicle transmission and diagrammatically a control system therefor, together incorporating the principles of the invention, and FIGURE 2 depicts a modified exhaust valve for the system.

*General Diagrammatic Arrangement*

Referring first to FIGURE 1, the transmission there depicted for demonstrating the invention is suited for installation at the rear end of a vehicle next to the rear axle. The transmission includes an input shaft 10 drive connected to the vehicle engine (not shown) and an output shaft 12 appropriately joined to the rear axle gearing 13 for driving the wheels. In between the input shaft 10 and the output shaft 12 is a torque converter 14 and planetary gearing 16 so arranged as to afford a plurality of forward drive ratios as will become apparent.

The torque converter 14 may be of any suitable type, for instance, the three-element one viewed, comprising an impeller I drive connected to the input shaft 10, a turbine T joined to the gearing input ring gear 18, and a stator S prevented from reverse rotation by a grounded one-way device 20. The one-way device 20 may be of any known construction utilizing sprags, rollers, or the equivalent, to prevent relative rotation between two members in a selected direction. The impeller I, turbine T, and stator S all have appropriate vanes so arranged that a working circuit is defined in which the fluid flows outwardly from the impeller and in a clockwise direction. When the converter 14 is multiplying torque, the stator S will tend to revolve backwards and this will be prevented by the one-way device 20; however, at some selected speed of the impeller I, the torque converter 14 will attain the coupling point at which time the stator S will revolve forwardly along with the impeller I and turbine T, and the torque converter 14 will operate as an efficient fluid coupling.

In addition to the input ring gear 18, the planetary gearing 16 includes a reaction sun gear 22 that meshes along with ring gear 18 with a series of planet pinions 24 journaled on an output carrier 26, which in turn is drive connected to the output shaft 12. For conditioning the gearing 16 for a reduced speed drive, a one-way device 28, similar to the one-way device 20, is combined with a forward brake 30. The forward brake 30 is engaged by a piston type fluid actuated servomotor 32 and will hold the outer race of the one-way device 28 against rotation in either direction. Therefore, reverse rotation of the reaction sun gear 22 will be resisted and with the input ring 18 being revolved forwardly, the input planet carrier 26 will be revolved likewise forwardly but at a reduced speed with respect thereto. An overrun brake 34 operated by servomotor 36 resists rotation of the reaction sun gear 22 in either direction and is employed for coast or overrun braking as will be explained.

When a direct drive ratio through the gearing 16 is desired, a hydrodynamic device such as fluid coupling 38 is rendered operative. This coupling 38 has a driving rotor 40 joined to the input shaft 10 and a driven rotor 42 drive connected to the reaction sun gear 22. Consequently, when the fluid coupling 38 is filled with fluid and becomes operative in a known manner to function as a fluid clutch, the reaction sun gear 22 will be revolved forwardly at substantially the same speed as the input shaft 10, a slight differential in speeds being due to the inherent slippage within the coupling 38. Then, if the torque converter 14 has attained the coupling point, the gearing input ring gear 18 will be revolved at substantially the same speed as the input shaft 10. Again, there will be a slight difference due to fluid slippage through the torque converter 14. However, for all practical purposes the input ring gear 18 and the reaction sun gear 22 will be revolving at the same speed, and therefore, the gearing 16 will be locked up for a direct drive therethrough.

The transmission operates in different ranges as follows: In Neutral, the forward brake 30 is disengaged and the fluid coupling 38 is drained of fluid. Therefore, the planetary gearing 16 is incapable of transferring drive from the torque converter 14 to the output shaft 12 and a true neutral is afforded.

In Drive Range, when vehicle movement is desired in a forward direction, the forward brake 30 is engaged, and then the vehicle will proceed forwardly in the reduced speed drive mentioned inasmuch as the planetary gearing 16 will be so conditioned for this drive due to the restraint offered by the one-way device 28 and the forward brake 30 to reverse rotational tendencies of the reaction sun gear 22. In this range of operation, an upshift takes place when the fluid coupling 38 is filled whereupon, as explained, the gearing 16 will be conditioned for a substantially direct drive.

An Intermediate Range is offered for moderate engine braking. In this range, both the overrun brake 34 and the forward brake 30 are engaged and as mentioned rotation of the reaction sun gear 22 in either direction is prevented. Hence, if the vehicle is allowed to coast and the output shaft 12 becomes the driver, the reaction on the sun gear 22 is reversed so as to tend to revolve the sun gear 22 forwardly. Since the overrun brake 34 prevents this, the ring gear 18 will be overdriven relative to the carrier 26. Drive at this overspeed ratio will be transferred by the torque converter 14 to the engine and resisted thereby. The resultant engine resistance will restrain the overspeeding tendency of the ring gear 18 and accordingly impede the output shaft 12 thereby offering the desired moderate engine braking. If the vehicle attains a predetermined speed, the transmission will upshift to direct drive as in Drive Range and the overrun brake 34 will be disengaged.

For greater braking a Drive Brake Range is provided in which both the forward brake 30 and the overrun brake 34 are engaged and the fluid coupling 38 is filled. The driven rotor 42 is therefore prevented from rotation in either direction and now functions as a stator. As a result, the same overspeeding obtained during coast in Intermediate Range is not only resisted by the engine as in Intermediate Range, but also by the coupling 38 now functioning as a hydrodynamic brake. The overdriving of the input shaft 10 will revolve the driving rotor 40, and the resultant churning effect between the driving rotor 40 and the stationary rotor 42 will offer considerable additional resistance to rotary movement of the output shaft 12 for increased braking.

No provision for a Reverse Drive has been shown. This drive may, however, be of any appropriate construction.

Control System

The fluid control system for operating the aforedescribed transmission is supplied with pressure fluid by a pump 44 preferably driven by the input shaft 10 in any customary way so that pressure fluid is made available as soon as the vehicle engine is started. The pressure delivered by the pump 44 is regulated by a pressure regulating valve 46 of suitable construction. This regulated pressure is then delivered by a main supply line 48 to a valve body 50 provided with a series of bores for slidably housing valving to be described. A governor feed line 52 also receives this regulated pressure fluid from the pressure regulating valve 46 and delivers it to a governor shown generally at 54. The governor 54 may be of any known construction for producing a pressure that is representative of, or proportional to, vehicle speed such as the governor shown in the patent to Thompson 2,204,872 issued June 18, 1940. The governor 54 may be driven by the output shaft 12 so as to deliver a governor pressure that is proportional to the speed of output shaft 12 to a governor supply line 56. The various valves housed by the valve body 50 are hereinafter discussed under the designated headings.

Manual Selector Valve

In the middle of FIGURE 1a, the manual selector valve is depicted and is denoted generally at 58. This valve 58 is provided with a series of spaced lands 60, 62, and 64 and is slidably housed within a bore in the valve body 50. At the left end thereof, as viewed, two spaced flanges 66 are formed on the end of the selector valve 58 and adapted to receive a fork or other suitable agency for maneuvering the selector valve 58 from the driver's compartment as by a steering column mounted selector lever (not shown) to the settings designated by the legends N. D. I, and $D_B$ corresponding respectively to the Neutral, Drive Range, Intermediate Range, and Drive Brake Range statuses for the transmission.

The manual selector valve 58 distributes pressure fluid delivered by the main supply line 48 to a port in the bore thereof through ports to a Drive Brake Range inhibiting line 68, a torque responsive valve feed line 70, a Drive Range supply line 72 and a branch 73 thereof, and an Intermediate Range supply line 74 as will be more clearly presented in the operational summary.

Pressure Limiting Valve

The pressure control or limiting valve is positioned to the right and above the manual selector valve 58 in FIGURE 1a, and is assigned the numeral 76. The limiting valve 76 is slidable in another bore in the valve body 50 and is formed with a small diameter land 78 and a large diameter land 80. These lands 78 and 80 are so spaced as to control fluid communication between ports connected to the Drive Range supply line 72 and a limited pressure supply line 82. The pressure limiting aspect is determined by a spring 84 bearing directly on the valve 76 and urging it to the left and a spring 86 encountered only when the edge of the land 80 engages a ring 88.

With this spring arrangement, if the pressure in the line 82 falls below some predetermined minimum because of the requirements upstream thereof, such as the filling of the fluid coupling 38, the spring 84 will become effective to shift the limiting valve 76 to the left until land 80 interrupts communication between the ports to the Drive Range supply line 72 and the limited pressure supply line 82. In this way, then, the pressure in the Drive Range supply line 72 and the remainder of the control system downstream therefrom is not permitted to decrease to a dangerous level that could in some way damage the transmission or result in faulty operation thereof.

If, on the other hand, the pressure upstream from the limiting valve 76 becomes too excessive for any reason, this pressure will be sensed in the line 82 and will urge the limiting valve 76 to the right due to the difference in areas between land 78 and 80. Upon moving to the right, the valve 76 will engage the ring 88 and compress spring 86 until land 80 opens an exhaust port 90. This excessive pressure will be relieved through exhaust port 90 thereby offering a safeguard to the system against extremely high pressures.

Torque Responsive Valve

For producing a pressure that is indicative of the torque load on the engine, the torque responsive valve shown generally at 92 in the lower right part of FIGURE 1, is utilized. This valve may be operated directly by the throttle or be of the type described in the application U.S. Serial No. 674,655 to Howard E. Olsen, filed July 29, 1957 and entitled Transmission. Briefly, as to the latter type and so as to understand more clearly the applicability of the torque responsive valve 92 to the control system for the transmission herein described, the torque responsive valve 92 is slidably positioned within another bore in the valve body 50 and has a series of lands formed thereon including two small and equal diameter lands 94 and 96, two equal and somewhat larger diameter lands 98 and 100, and still larger lands 102 and 104, land 104 being somewhat larger than land 102. The right end of the torque responsive valve 92 is connected to a bellows 106, and the bellows 106 in turn communicates through a conduit 108 with the engine manifold 110.

In discussing manifold pressure it should be kept in mind that the intake manifold of a vehicle engine generally supplies a vacuum or negative pressure. With the engine idling, the vacuum developed is maximum and consequently a maximum manifold pressure will be acting on the bellows 106 compressing it against some bias built into the bellows 106 and urge the torque responsive valve 92 to the right. Therefore, a maximum manifold pressure corresponds to a minimum torque load on the engine. As the torque load increases, this vacuum will decrease or approach atmospheric pressure, and accordingly, the manifold pressure will fall and allow the bellows 106 to expand or return to the normal or relaxed position and move the torque responsive valve 92 back to the left and to the position viewed. With these two extremes, and as will become more apparent, the torque responsive valve 92 is arranged so that with a maximum manifold pressure, a minimum control pressure is developed, and with a minimum manifold pressure corresponding to maximum torque load, a maximum control pressure is produced.

To explain further, assume that the manifold pressure acting on the bellows 106 is such that land 94 opens a port connected to the torque responsive valve feed line 70. As a result, this pressure fluid will proceed to a reaction chamber 112 through a restricted opening 114 thereto. Because of the differential areas determined by lands 96 and 98, the pressure fluid in the reaction chamber 112 will urge the torque responsive valve 92 to the right and if this pressure is greater than that for which the bellows 106 is set at that time, the land 94 will close the port to the torque responsive valve feed line 70 and land 100 will open an exhaust port 116. A regulated or control pressure so developed will then be delivered to a control pressure supply line 118. As the pressure in the reaction chamber 112 decreases below the desired level, the land 94 will be returned to the position in which the port to the torque responsive valve supply line 70 is again reopened. This well known regulating cycle will continue so as to develop a control pressure in accordance with the bias exerted from the bellows 106.

With this arrangement, considering the two extreme conditions, i.e., maximum and minimum manifold pressures, the valve 92 will develop corresponding minimum and maximum control pressures in the aforedescribed manner reflecting respectively minimum and maximum engine loads. As the load on the engine increases, manifold pressure will decrease and the control pressure produced by the valve 92 will increase in proportion to the increase in the engine torque load.

It should be noted that the reaction chamber 112 is exposed on each side to fluid of the same pressure as that in the reaction chamber 112. As a result, leakage from the reaction chamber 112 is of no consequence in the development of an accurate control pressure.

Supply Valve

Displayed opposite the pressure limiting valve 76 at the top right part of FIGURE 1a and denoted by the numeral 120 is the supply valve. This valve 120 has spaced lands 122, 124, and 126 formed thereon, the land 126 being smaller than the others, and is urged to the right and to the viewed position by a spring 128. In the depicted position, the lands 122 and 124 permit, by the alignment thereof, communication between a port to the limited pressure supply line 82 and a signal line 130. If pressure fluid is delivered by the Drake Brake Range inhibiting line 68 to the supply valve 120, this pressure will act on the differential areas defined by lands 124 and 126 and urge the supply valve 120 to the left until the port to the signal line 130 is aligned with an air exhaust 132 at which time this signal line 130 will be relieved to the atmosphere. Somewhat similarly, if the control pressure delivered by a control pressure supply line 118 and a branch 134 thereof to the end area of the supply valve 120 defined by small diameter land 126 is sufficient to overcome the bias from spring 128, the supply valve 120 will also be forced thereby to the left. The relationship of this supply valve 120 will be explained more in detail in the summary of the operation of the control system.

Exhaust Valve

The exhaust valve is designated by the numeral 136 and is shown at the lower right part of FIGURE 1a. This valve 136 is provided with spaced lands 138 and 140 of equal diameters and a smaller land 142. A spring 144 biases the exhaust valve 136 to the demonstrated position in which the lands 138 and 140 align ports to the coupling exhaust line 146 and a restricted exhaust port 148. If, as with the supply valve 120, there is pressure existent in the Drive Brake Range inhibiting line 68, this pressure will act on the differential areas determined by lands 140 and 142 urging the exhaust valve 136 to the left until the restricted exhaust port 148 is cut off and the port to the coupling exhaust line 146 is aligned with an air exhaust 150. Control pressure when of a predetermined value can likewise urge the exhaust valve 136 to the latter position such being delivered via a branch 152 of the control pressure supply line 118 to the end area of land 142. The operation and purpose of this valve will become more apparent during the description of the operation of the transmission.

Shift Valve

Viewed in the left part of FIGURE 1 and denoted by the numeral 154, is a shift valve formed with a series of spaced lands 156, 158, 160, and 162. The shift valve 154 is slidable in an elongated bore in the valve body 50, which bore has slidable therein on the left side of the shift valve 154 a modulator valve 164 provided with a single land 166 and biased from engagement with the end of the shift valve 154 by a spring 168. On the right side of the shift valve 154 is a governor valve 170 having spaced apart lands 172, 174, and 176 formed thereon. The extreme right end of the governor valve 170 is exposed to governor pressure delivered thereto by governor supply line 56.

The modulator valve 164 develops a modulated control pressure when the shift valve 154 is in the viewed position. In this position, a port in the shift valve bore for a branch 178 of the control pressure supply line 118 is aligned by lands 156 and 158 with a port to a cross-passage 180 leading to the left end of the modulator valve 164. This control pressure will urge the modulator valve 164 to the right against the bias from the spring 168 and when of a sufficient value will cause the land 166 to open a port to a passage 182. The resultant modulated pressure will proceed to the spring pocket 183 and act both on the shift valve 154 and the modulator valve 164 so that if above the selected value, the modulator valve 164 will be urged back to the left and an exhaust port 184 will be opened thereby reducing the modulated pressure in the spring pocket 183. Once this pressure is relieved sufficiently, the modulator valve 164 will again be moved to the right and pressure again delivered via passage 182 to spring pocket 183. This regulating action is the same as that of the torque responsive valve 92 and will continue to develop a modulated pressure determined by the available control pressure and the bias acting to urge the modulator valve 164 to the left.

The relationship of the shift valve to the other parts of the control system will be discussed in the following operational summary.

Operation

The operation of the control system will now be described in the same sequence of transmission statuses and under the same headings as occur when the selector valve 58 is moved from left to right as viewed, starting with Neutral.

Neutral

With the manual selector valve in the Neutral setting and with the engine revolving pump 44, the disposition of the lands 62 and 64 thereon is such that pressure fluid from the main supply line 48 is delivered both to the Drive Brake Range inhibiting line 68 and the torque responsive valve supply line 70. The torque responsive valve 92 will commence to operate and develop a control pressure in accordance with the engine manifold pressure as has been explained.

The pressure in the Drive Brake Range inhibiting line 68 will cause the supply valve 120 to be moved to the left and interrupt communication between the limited pressure supply line 82 and the signal line 130; however, since the Drive Range supply line 72 is opened by the manual selector valve land 64 to an exhaust port 185 in the bore for the selector valve 58, there will be no pressure in the limited pressure supply line 82. As for the exhaust valve 136, the pressure in the Drive Brake Range inhibiting line 68 will force this valve 136 to the left so that the coupling exhaust line 146 is opened to atmosphere through air exhaust 150. The coupling exhaust line 146 communicates with a coupling rim exhaust line 186 extending to the rim of the coupling 38 through the bore of the shift valve 154 and between shift valve lands 158 and 160. Consequently, the fluid coupling 38 will be emptied if there had been fluid therein. Also, both the overrun brake 34 and the forward brake 30 will be disengaged. As has been explained, this renders the planetary gearing 16 ineffective to transfer drive and the transmission is conditioned for Neutral.

Drive Range

To establish Drive Range and start movement of the vehicle, the manual selector valve is moved to the Drive Range setting viewed, and now pressure fluid from the main supply line 48 is delivered to the Drive Range supply line 72 and branch 73 thereof to the servomotor 32 for the forward brake 30. This pressure will engage the forward brake and afford reaction for the planetary gearing 16 so that drive can be commenced in the low speed ratio. Pressure fluid will be delivered in this speed ratio to the limited pressure supply line 82, but the supply valve 120 will still be maintained in the position assumed in Neutral due to the pressure delivered thereto via the Drive Brake Range inhibiting line 68 and interrupt further progress of pressure fluid in the limited pressure supply line 82 beyond the supply valve 120. Also, the exhaust valve 136 will continue to connect the coupling exhaust line 146 with the air exhaust 150.

After some predetermined speed of the vehicle is attained, so that the governor pressure delivered by the governor supply line 56 to the end of the governor valve 170 is adequate to overcome the modulated torque responsive pressure in the spring pocket 183, the shift valve 154 will be moved to the left and align ports to the limited pressure supply line 82 and a coupling feed line 188. Also, a branch 190 of the limited pressure supply line will be aligned by shift valve lands 160 and 162 with a shift signal line 192 extending to the exhaust valve 136. The pressure in the shift signal line 192 will combine with the spring 144 and return the exhaust valve 136 to the viewed position connecting the coupling exhaust line 146 to the restricted exhaust port 148. The coupling 38 will commence to fill and if this filling of the coupling reduces the pressure in the limited pressure supply line 82 below the selected value, the pressure limiting valve 76 will become effective as explained and temporarily halt further supply thereto until the pressure in the Drive Range supply line 72 can build up again sufficient to reopen the pressure limiting valve 76. After the shift valve 154 has moved to the upshifted position, the land 160 thereon will interrupt communication between the coupling rim exhaust line 186 and coupling exhaust line 146 extending to the exhaust valve 136. As a result, the only exhaust for the coupling is that shown generally at 193 in the hub area of the coupling 38. This coupling hub exhaust 193 is restricted but is intended to be adequate for cooling purposes as well as sufficient for feeding various lubrication channels in the transmission.

With the coupling 38 filled, the planetary gearing 16 is now conditioned in the manner previously described for the high speed and substantially direct drive ratio.

A downshift from the direct drive ratio occurs with a reverse cycle of events, i.e., the shift valve 154 returns to the downshifted position, and the coupling 38 is drained through the air exhaust 150 in the exhaust valve bore. By connecting the coupling 38 to atmosphere through air exhausts 132 and 150, a partial vacuum can not form therein and interfere with the required quick emptying action.

Intermediate Range

The next setting of the manual selector valve 58 is the Intermediate Range setting and in this, the land 64 permits communication between the main supply line 48 and the Intermediate Range supply line 74 extending to the governor valve 170. With the governor valve 170 in the downshifted position, lands 174 and 176 permit communication between the Intermediate Range supply line and an overrun brake supply line 194. The pressure fluid delivered to line 194 will actuate the overrun brake servo and engage the overrun brake 34. The supply valve 120 and exhaust valve 136 with continue in the same positions they assumed in Drive Range.

Now that the overrun brake 34 is engaged, the reaction sun gear 22 is prevented from rotation in either direction, and hence, the moderate range of braking explained before is now available. If the vehicle speed is increased to the point where the shift valve 154 upshifts, it is necessary to disengage the overrun brake 34. This takes place because the governor valve 170 will move to the left, thereby interrupting communication between the Intermediate Range supply line 74 and the overrun brake supply line 194 and exhausting the overrun brake supply line 194.

Except for the engagement of the overrun brake in low speed in the Intermediate Range, the low speed and the high speed ratios are the same as in the aforedecribed Drive Range with the coupling 38 being filled in high speed in exactly the same manner.

Drive Brake Range

In the Drive Brake Range setting of the selector valve 58, land 62 interrupts communication between the main supply line 48 and the Drive Brake Range inhibiting line 68; the pressure existing in the Drive Brake Range inhibiting line 68 is relieved to an exhaust passage 196 in the selector valve bore and therefore both the supply valve 120 and the exhaust valve 136 will be maintained in or removed to the viewed positions. Since the Intermediate Range supply line 74 still receives pressure fluid, the overrun brake 34 will be engaged and prevent the coupling rotor 42 as well as the reaction sun gear 22 from rotation in either direction. Consequently, with the supply valve 120 in the illustrated position, pressure in the limited pressure supply line 82 is delivered via signal line 130 to the shift valve 154. Shift valve 154 in the downshifted position demonstrated permits pressure fluid to be transferred from signal line 130 between the governor valve lands 172 and 174 to the coupling feed line 188 and the coupling 38 will be filled. Exhaust from the rim of the coupling is through the coupling rim exhaust line 186 between shift valve lands 158 and 160, coupling exhaust line 146 and out of the restricted exhaust port 148 at a relatively slow rate. The coupling hub exhaust 193 is also effective so that together with exhaust port 148 circulation is proper for the churn braking action.

Again, as the coupling 38 is being filled, if the pressure should in the limited pressure supply line 82 fall below the desired level, the pressure limiting valve 76 will become effective to preserve the pressure downstream therefrom and in the Drive Range supply line 72. Likewise, if the pressure within the fluid coupling 38 becomes too excessive, the pressure limiting valve 76 in the manner explained will relieve this pressure.

Since Drive Brake Range is to be used for engine braking and such is obtained in the manner explained, i.e., the fluid coupling 38 in this range functions as a fluid brake to resist rotation of the input shaft 10 along with the engine, it is necessary to provide a safeguard against the possibility of the vehicle driver changing from coast drive to forward drive. This is accomplished by having each of the valves 120 and 136 in communication with the torque responsive control pressure in the control pressure supply line 118. Therefore, when the control pressure becomes of a predetermined value, as occurring when the driver depresses the accelerator pedal to open the throttle and commence forward drive, this control pressure will move the supply valve 120 to the left so as to open signal line 130 to air exhaust 132 and interrupt supply of the pressure fluid to the coupling 38. Simultaneously the exhaust valve 136 will be moved to the left and open the coupling exhaust line 146 to the air exhaust 150 for a fast rate of discharge at the coupling rim to insure quick drainage of the coupling 38.

It is possible for the shift valve 154 to move to the upshifted position or be in the upshifted position when the Drive Brake Range is selected. When this occurs, as explained before, the supply of pressure fluid to the overrun brake servo 36 is interrupted and the overrun brake 34 disengaged. As a result, no braking is available, the one-way device 28 offering no restraint to the forward rotation of the reaction sun gear 22 when in forward drive.

The shift signal line 192 with the shift valve 154 in the downshifted position is relieved via exhaust ports 198 and 200 in the shift valve bore; but when the shift valve 154 is the upshifted position, the shift valve lands 160 and 162 align the ports connected to branch 190 of the limited pressure supply line 82 and the shift signal line 192 as has been mentioned. As a result, the exhaust value 136 is held in the depicted restricted or slow exhaust rate position in preparation for selection of the Drive Brake Range when the Drive Range is effective. In this way the coupling 38 is not for an instant open to the air exhaust 150, for this could cause the coupling 38 to be drained partially or entirely and interfere with the desired braking action.

In FIGURE 2 a modified exhaust or control valve, noted generally by the numeral 136', is illustrated. This valve 136' is the same as the previously explained exhaust valve 136 except that the lands 138', 140' and 142' have a different relationship dimensionally to each other. The remainder of the structure is the same as that for the exhaust valve 136, and therefore, the same numerals have been employed. As will be noted, the restricted exhaust port 148 appearing with the exhaust valve 136 has been omitted, and the diameters of the lands 138' and 140' are not the same. These diameters have been so altered that the pressure within the coupling exhaust line 146 will act thereon and if above a predetermined value, will force the control valve 136' leftwardly so as to crack the air exhaust port 150 sufficiently to maintain a relatively constant pressure within the coupling 38 when performing as a brake. As a consequence, the pressure within the coupling 38 will be maintained constant despite changes in speed, and this will afford certain advantages in some installations where it is desirable to have such a constant pressure. Except for this constant pressure aspect, the control valve 136' functions as the exhaust valve 136 and is in an exhaust position corresponding to the fast exhaust position on valve 136, i.e., with the air exhaust 150 fully open, at the same instances as the exhaust valve 136. Also, whenever the exhaust valve 136 is in the slow exhaust rate position, the control exhaust valve 136' will be in a control position in which the constant pressure is maintained within the coupling 38.

From the foregoing it can be seen that the invention utilizes a fluid coupling, which is needed for forward drive, as a fluid brake during coast drive and thereby avoids the necessity of separate structure. Also, the controls for the combined clutch and brake are uniquely coordinated so as to cover all possible unusual operating situations that could conceivably produce damage to the transmission.

The invention is to be limited only by the following claims:

1. In a hydrodynamic brake for an engine driven vehicle; the combination of an input shaft drive connected to the vehicle engine; an output shaft drive connected to the vehicle wheels; means for drive connecting the input and output shafts; the hydrodynamic brake being arranged to resist rotation of one of the shafts; and a control system for the hydrodynamic brake comprising fluid supply means operative for controlling the delivery of fluid to the hydrodynamic brake, fluid exhaust means operative for controlling the exhaust of fluid from the hydrodynamic brake so as to cause fluid to be exhausted at different rates, and means responsive to the torque demand on the engine for rendering the supply means inoperative to deliver fluid to the hydrodynamic brake.

2. In a hydrodynamic brake for a throttle controlled vehicle engine; the combination of an input shaft drive connected to the vehicle engine; an output shaft drive connected to the vehicle wheels; means for drive connecting the input and output shafts; the hydrodynamic brake being arranged so as to resist rotation of one of the shafts; and a control system for the hydrodynamic brake comprising fluid supply means operative for controlling the delivery of fluid to the hydrodynamic brake, fluid exhaust means operative for controlling the exhaust of fluid from the hydrodynamic brake so as to cause fluid to be exhausted at different rates, and means responsive to torque demand on the engine for rendering both the supply means inoperative to deliver fluid to the hydrodynamic brake and the fluid exhaust means effective to increase the rate of exhaust when the throttle is opened.

3. In a hydrodynamic brake for a throttle controlled vehicle engine; the combination of a shaft drive connected to the vehicle engine; a vaned rotor rotatable with the shaft; a vaned stator; means for resisting rotation of the stator; the hydrodynamic brake having an inlet and an outlet; and a control system for the hydrodynamic brake comprising a source of pressure fluid, a supply valve arranged so as to control the supply of pressure fluid from the source to the brake inlet, an exhaust valve arranged so as to control the exhaust of fluid from the brake outlet, a limit valve for maintaining the pressure of the fluid in the inlet within a predetermined range, and means responsive to torque demand on the engine for causing, when the throttle is opened, both the supply valve to interrupt the supply of fluid to the hydrodynamic brake inlet and the exhaust valve to exhaust fluid from the brake outlet at a faster rate so as to drain the brake.

4. In combination; input and output members; forward drive and coast drive trains for transferring drive between the members; selector means for determining the drive train to be effective; a hydrodynamic device common to both of the trains, the hydrodynamic device being so arranged as to function as a clutch when the forward drive train is effective and as a brake when the coast drive train is effective; a control system comprising a source of pressure fluid, first supply means operative to connect when the forward drive train is effective the hydrodynamic device to the source so that the hydrodynamic device functions as a clutch, second supply means operative when the coast drive train is effective to connect the hydrodynamic device to the source so that the hydrodynamic device functions as a brake, and exhaust means for controlling the exhaust of fluid from the hydrodynamic device so as to cause the fluid to be exhausted at different rates.

5. In combination; input and output members; forward drive and coast drive trains for transferring drive between the members; selector means for determining the drive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; and a control system comprising a source of pressure fluid, first supply means operative to connect when the forward drive train is effective the source to the hydrodynamic device so that the hydrodynamic device functions as a clutch, second supply means operative to connect when the coast drive train is effective the source to the hydrodynamic device so that the hydrodynamic device functions as a brake, exhaust means for controlling the exhaust of fluid from the hydrodynamic device, and means for rendering the second supply means inoperative when the coast drive train is effective and drive is from the input to the output.

6. In combination; input and output members; forward drive and coast drive trains for transferring drive between the members; selector means for determining the drive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; and a control system comprising a source of pressure fluid, first supply means operative to connect when the forward drive train is effective the source to the hydrodynamic device so that the hydrodynamic device functions as a clutch, second supply means operative to connect when the coast drive train is effective the source to the hydrodynamic device so that the hydrodynamic device functions as a brake, exhaust means for controlling the exhaust of fluid from the hydrodynamic device so as to cause fluid to be exhausted at different rates, and pressure control means for maintaining pressure fluid delivered to the hydrodynamic device within a predetermined range.

7. In combination; input and output members; forward drive and coast drive trains for transferring drive between the members; selector means for determining the drive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; a control system comprising a source of pressure fluid, a first supply valve operative when the forward drive train is effective to connect the hydrodynamic device to the source so that the hydrodynamic device functions as a clutch, a second supply valve operative when the coast drive train is effective to connect the hydrodynamic device to the source so that the hydrodynamic device functions as a brake, an exhaust valve movable between fast and slow rate positions so as to relieve the hydrodynamic device respectively at fast and slow rates, means operative when the forward drive train is effective to move the exhaust valve to the fast rate position, means coacting with the first supply valve when the first supply valve is operative to move the exhaust valve to the slow rate position, and means for causing the exhaust valve to move to the slow rate position when the coast drive train is effective.

8. In combination; input and output members; forward drive and coast drive trains for transferring drive between the members; a selector for determining the drive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; a control system comprising a source of pressure fluid, a first supply valve movable from an inoperative position so as to disconnect the source from the hydrodynamic device to an operative position so as to connect the source to the hydrodynamic device; means for moving the first supply valve to the operative position when the forward drive train is effective so that the hydrodynamic device functions as a clutch, a second supply valve operative when the coast drive train is effective to connect the hydrodynamic device to the source so that the hydrodynamic device functions as a brake, an exhaust valve movable between fast and slow rate positions so as to relieve the hydrodynamic device respectively at fast and slow rates, selector operated means rendered operative when the forward drive train is effective both to move the exhaust valve to the fast rate position and render the second supply valve inoperative to connect the source to the hydrodynamic device, means coacting with the first supply valve when moved to the operative position to move the exhaust valve to the slow rate position, biasing means for moving the exhaust valve to the slow rate position when the coast drive train is effective, and means responsive to a predetermined torque load on the input member when the coast drive train is effective for rendering the second supply valve inoperaitve to connect the source to the hydrodynamic device and for causing the exhaust valve to move to the fast rate position.

9. In a transmission for a throttle controlled engine; an input member drive connected to the engine; an output member; forward drive and coast drive trains for transferring drive between the members; a selector for determining the dive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; a control system comprising a source of pressure fluid, a first supply valve movable from an inoperative position so as to disconnect the source from the hydrodynamic device to an operative position so as to connect the source to the hydrodynamic device, means for moving the first supply valve to the operative position when the forward drive train is effective so that the hydrodynamic device functions as a clutch, a second supply valve operative when the coast drive train is effective to connect the hydrodynamic device to the source so that the hydrodynamic device functions as a brake, an exhaust valve movable between fast and slow rate positions so as to relieve the hydrodynamic device at fast and slow rates, selector operated means rendered operative when the forward drive train is effective to move the exhaust valve to the fast rate position and render the second supply valve inoperative to connect the source to the hydrodynamic device, means coacting with the first supply valve when moved to the operative position to move the exhaust valve to the slow rate position, biasing means for moving the exhaust valve to move to the slow rate position when the coast drive train is effective, a pressure limiting valve for interrupting the supply of pressure fluid from the source to the hydrodynamic device when the fluid pressure to the hydrodynamic device is below a predetermined minimum and for relieving the fluid pressure to the hydrodynamic device when above a predetermined maximum, and means responsive to torque demand on the engine for rendering the second supply valve inoperative to connect the source to the hydrodynamic device when the coast drive train is effective and the throttle is opened.

10. In a transmission, the combination of input and output shafts, forward drive and coast drive trains for transferring drive between the shafts, the forward drive train being arranged to provide a plurality of forward drive ratios, selector means for choosing the drive train to be effective, a shift valve adapted in one position to cause the forward drive train to be conditioned for one drive ratio and another position to cause the forward drive train to be conditioned for another drive ratio, a hydrodynamic device common to both trains and arranged to function as a fluid clutch and establish said another drive ratio when the forward drive train is effective and as a fluid brake so as to resist rotation of the output shaft when the coast drive train is effective, a source of pressure fluid, a supply valve operative when the coast drive train is effective to deliver pressure fluid from the source to the hydrodynamic device so that the hydrodynamic device functions as a brake, and an exhaust valve movable between fast and slow rate positions so as to relieve the hydrodynamic device respectively at fast and slow rates.

11. In a transmission, the combination of input and output shafts, forward drive and coast drive trains for transferring drive between the shafts, a hydrodynamic device common to both trains and arranged to function as a fluid clutch when the forward drive train is effective and as a fluid brake when the coast drive train is effective, the forward drive train being arranged to provide a plurality of forward drive ratios, selector means for choosing the drive train to be effective, a shift valve adapted in one position to cause the forward drive train to be conditioned for one drive ratio and another position to cause the forward drive train to be conditioned for another drive ratio, a source of pressure fluid, a supply valve operative when the coast drive train is effective to deliver pressure fluid from the source to the hydrodynamic device so that the hydrodynamic device functions as a brake, and an exhaust valve movable between fast and slow rate positions so as to relieve the hydrodynamic device respectively at fast and slow rates, the shift valve in said another position being arranged to establish communication between the source and the hydrodynamic device so that the hydrodynamic device functions as a clutch and establishes said another drive ratio, the selector means being adapted when the forward drive train is effective both to cause the supply valve to become inoperative to deliver pressure fluid to the hydrodynamic device and to move the exhaust valve to the fast rate position.

12. In a transmission, the combination of input and output shafts, forward drive and coast drive trains for transferring drive between the shafts, a hydrodynamic device common to both trains and arranged to function as a fluid clutch when the forward drive train is effective and as a fluid brake when the coast drive train is effective, the forward drive train being arranged to provide a plurality of forward drive ratios, selector means for choosing the drive train to be effective, a shift valve adapted in one position to cause the forward drive train to be conditioned for one drive ratio and another position to cause the forward drive train to be conditioned for another drive ratio, a source of pressure fluid, a supply valve operative when the coast drive train is effective to deliver pressure fluid from the source to the hydrodynamic device so that the hydrodynamic device functions as a brake, an exhaust valve movable between fast and slow rate positions so as to relieve the hydrodynamic device respectively at fast and slow rates, the shift valve in said another position being arranged both so as to move the exhaust valve to the slow rate position and so as to establish communication between the source and the hydrodynamic device thereby causing the hydrodynamic device to function as a clutch and establish said another drive ratio, and means operative when the coast drive train is effective and drive is being transferred from the input shaft to the output shaft to cause the supply valve to be rendered inoperative to deliver pressure fluid from the source to the hydrodynamic device and to move the exhaust valve to the fast rate position.

13. In a transmission, the combination of input and output shafts, forward drive and coast drive trains for transferring drive between the shafts, a hydrodynamic device common to both trains, the forward drive train being arranged to provide a plurality of forward drive ratios, selector means for choosing the drive train to be effective, a shift valve adapted in a downshifted position to cause the forward drive train to be conditioned for a relatively slow drive ratio and in an upshifted position to cause the forward drive train to be conditioned for a relatively fast drive ratio, the hydrodynamic device being arranged to function as a fluid clutch and establish the fast drive ratio when the forward drive train is effective and as a fluid brake so as to resist rotation of the output shaft when the coast drive train is effective, a source of pressure fluid, a supply valve operative when the coast drive train is effective to deliver pressure fluid from the source to the hydrodynamic device so that the hydrodynamic device functions as a brake, and an exhaust valve movable between fast and slow rate positions so as to relieve the hydrodynamic device respectively at fast and slow rates, the selector means being adapted when the forward drive train is effective both to cause the supply valve to become inoperative to deliver pressure fluid to the hydrodynamic device and to move the exhaust valve to the fast discharge position, the shift valve in the downshifted position being arranged when the coast drive train is effective to establish fluid communication between the supply valve and the hydrodynamic device and in the upshifted position when the forward drive train is effective both to establish direct fluid communication between the source and the hydrodynamic device and to move the exhaust valve to the slow rate position.

14. In a transmission for a throttle controlled engine, the combination of an input shaft drive connected to the engine, an output shaft, forward drive and coast drive trains for transferring drive between the shafts, a hydrodynamic device common to both trains, the forward drive train being arranged to provide a plurality of forward drive ratios, a selector for choosing the drive train to be effective, a shift valve adapted in a downshifted position to cause the forward drive train to be conditioned for a relatively slow drive ratio and in an upshifted position to cause the forward drive train to be conditioned for a relatively fast drive ratio, the hydrodynamic device being arranged to function as a fluid clutch and establish the fast drive ratio when the forward drive train is effective and as a fluid brake so as to resist rotation of the output shaft when the coast drive train is effective, a source of pressure fluid, a supply valve operative when the coast drive train is effective to cause pressure fluid to be delivered from the source to the hydrodynamic device so that the hydrodynamic device functions as a brake, and an exhaust valve movable between fast and slow rate positions so as to relieve the hydrodynamic device respectively at fast and slow rates, the selector being adapted when the forward drive train is effective both to cause the supply valve to become inoperative to deliver pressure fluid to the hydrodynamic device and to move the exhaust valve to the fast rate position, the shift valve in the downshifted position being arranged when the coast drive train is effective to establish fluid communication between the supply valve and the hydrodynamic device and in the upshifted position when the forward drive train is effective both to establish direct fluid communication between the source and the hydrodynamic device and to move the exhaust valve to the slow rate position, and throttle position responsive means for causing when the coast drive train is effective and drive is being transferred from the engine the supply valve to be rendered inoperative to deliver pressure fluid to the hydrodynamic device and the exhaust valve to be moved to the fast rate position.

15. In combination; input and output members; forward drive and coast drive trains for transferring drive between the members; selector means for determining the drive train to be effective; a hydrodynamic device common to both of the trains and including a pair of rotors; the hydrodynamic device being so arranged when the forward drive train is effective as to have the rotors thereof revolvable respectively with the input and output members so as to function as a clutch to complete the forward drive train and so arranged when the coast drive train is effective as to have one of the rotors revolvable with one of the members and the other of the rotors held against rotation so as to function as a brake to resist rotation of the output member; brake means for holding said other of the rotors against rotation; a control system comprising a source of pressure fluid, a first supply valve operative when the forward drive train is effective to connect the hydrodynamic device to the source so that the hydrodynamic device functions as a clutch, a second supply valve operative when the coast drive train is effective to connect the hydrodynamic device to the source so that the hydrodynamic device functions as a brake, a control valve so arranged in an exhaust position as to relieve the hydrodynamic device and in a control position to regulate the pressure within the device, means operative when the forward drive train is effective to move the control valve to the exhaust position, means coacting with the first supply valve when the first supply valve is operative to move the control valve to the control position, and means for causing the control valve to move to the control position when the coast drive train is effective.

16. In a transmission, the combination of input and output shafts, forward drive and coast drive trains for transferring drive between the shafts, the forward drive train being arranged to provide a plurality of forward drive ratios, selector means for choosing the drive train to be effective, a shift valve adapted in one position to cause the forward drive train to be conditioned for one drive ratio and another position to cause the forward drive train to be conditioned for another drive ratio, a hydrodynamic device common to both trains and arranged to function as a fluid clutch and establish said another drive ratio when the forward drive train is effective and as a fluid brake so as to resist rotation of the output shaft when the coast drive train is effective, a source of pressure fluid, a supply valve operative when the coast drive train is effective to deliver pressure fluid from the source to the hydrodynamic device so that the hydrodynamic device functions as a brake, and a control valve so arranged in an exhaust position as to relieve the hydrodynamic device and in a control position to regulate the pressure within the device.

17. In a transmission, the combination of input and output shafts, forward drive and coast drive trains for transferring drive between the shafts, a hydrodynamic device common to both trains, the forward drive train being arranged to provide a plurality of forward drive ratios, selector means for choosing the drive train to be effective, a shift valve adapted in a down-shifted position to cause the forward drive train to be conditioned for a relatively slow drive ratio and in an upshifted position to cause the forward drive train to be conditioned for a relatively fast drive ratio, the hydrodynamic device being arranged to function as a fluid clutch and establish the fast drive ratio when the forward drive train is effective and as a fluid brake so as to resist rotation of the output shaft when the coast drive train is effective, a source of pressure fluid, a supply valve operative when the coast drive train is effective to deliver pressure fluid from the source to the hydrodynamic device so that the hydrodynamic device functions as a brake, a control valve so arranged in an exhaust position as to relieve the hydrodynamic device and in a control position to maintain the pressure within the device relatively constant, the selector means being adapted when the forward drive train is effective both to cause the supply valve to become inoperative to deliver pressure fluid to the hydrodynamic device and to move the control valve to the exhaust position, the shift valve in the downshifted position being arranged when the coast drive train is effective to establish fluid communication between the supply valve and the hydrodynamic device and in the upshifted position when the forward drive train is effective both to establish direct fluid communication between the source and the hydrodynamic device and to move the control valve to the control position.

18. In combination; a source of power having controls therefor and a load; an element drive connecting the source of power to the load; a hydrodynamic brake resisting rotation of the element; and a control system for the hydrodynamic brake comprising fluid supply means controlling the supply of fluid to the hydrodynamic brake, fluid exhaust means controlling the exhaust of fluid from the hydrodynamic brake, and means responsive to a condition of the controls for the power source and arranged so as to render both the fluid supply means inoperative and the fluid exhaust means effective to increase the rate of exhaust when the element is being driven by the source of power.

19. In a hydrodynamic brake, the combination of a power source having controls therefor and a load; an element drive connecting the power source and the load; a rotor revolvable with the element; a stator; means resisting rotation of the stator; and a control system for the hydrodynamic brake comprising fluid supply means operative for controlling delivery of fluid to the hydrodynamic brake, fluid exhaust means operative for controlling the exhaust of fluid from the hydrodynamic brake so as to cause the fluid to be exhausted at different rates, and means responsive to a condition of the controls for the power source for rendering the brake inoperative when drive is between the power source and the load in a predetermined direction.

20. In combination; a power source having controls therefor; an input drive connected to the power source; a load; an output drive connected to the load; means drive connecting the input and the output; a hydrodynamic brake for resisting rotation of the output; and a control system for the hydrodynamic brake comprising fluid supply means operative for controlling the supply of fluid to the hydrodynamic brake, means controlling the fluid pressure within the hydrodynamic brake, and means responsive to a condition of the controls for the power source and arranged so as to render the fluid supply means inoperative and also the controlling means ineffective when the condition of the power source exists.

21. In a hydrodynamic brake for an engine driven vehicle; the combination of an input shaft drive connected to the vehicle engine; an output shaft drive connected to the vehicle wheels; means drive connecting the input and output shafts; the hydrodynamic brake being arranged so as to resist rotation of one of the shafts; and a control system for the hydrodynamic brake comprising fluid supply means operative for controlling the delivery of fluid to the hydrodynamic brake, fluid exhaust means operative for controlling the exhaust of fluid from the hydrodynamic brake so as to cause fluid to be exhausted at different rates, and means responsive to the torque demand on the engine for rendering both the supply means inoperative to deliver fluid to the hydrodynamic brake and the fluid exhaust means effective to increase the flow of exhaust when a torque demand is made on the engine to transfer torque to the input shaft.

22. In a hydrodynamic brake; the combination of a power source; a shaft drive connected to the power source; a vaned rotor rotatable with the shaft; a vaned stator; means resisting rotation of the stator; the hydrodynamic brake having an inlet and an outlet; and a control system for the hydrodynamic brake comprising a source of pressure fluid, a supply valve arranged so as to control the supply of fluid from the source to the brake inlet, an exhaust valve arranged so as to control the exhaust of fluid from the brake outlet, a limit valve for maintaining the pressure of the fluid in the inlet within a predetermined range, and means responsive to the torque demand on the power source for causing, when a torque demand is made on the power source, to transfer torque to the shaft, both the supply valve to interrupt the supply of fluid to the hydrodynamic brake inlet and the exhaust valve to exhaust fluid from the brake outlet at a faster rate so as to drain the brake.

References Cited in the file of this patent

UNITED STATES PATENTS

| | | |
|---|---|---|
| 2,722,296 | Stoeckicht | Nov. 1, 1955 |
| 2,845,817 | Polomski | Aug. 5, 1958 |
| 2,864,473 | Christenson et al. | Dec. 16, 1958 |
| 2,873,618 | De Lorean | Feb. 17, 1959 |